United States Patent
Nakagawa et al.

[11] Patent Number: 6,029,563
[45] Date of Patent: Feb. 29, 2000

[54] COOKING MACHINE

[75] Inventors: Yoshiyuki Nakagawa, Kitakatsuragi-gun; Shunji Shiono, Habikino; Tatsuhisa Fukuda, Daito, all of Japan

[73] Assignees: Sanyo Electric Co., Ltd., Osaka; Sanyo Home Tech Co., Ltd., Kyoto, both of Japan

[21] Appl. No.: 09/397,124

[22] Filed: Sep. 16, 1999

[30] Foreign Application Priority Data

| Sep. 18, 1998 | [JP] | Japan | 10-265237 |
| Sep. 18, 1998 | [JP] | Japan | 10-265238 |
| Sep. 18, 1998 | [JP] | Japan | 10-265239 |
| Sep. 18, 1998 | [JP] | Japan | 10-265240 |

[51] Int. Cl.[7] .............. A21B 1/00; A21D 8/00; A47J 27/00; A47J 37/00; A47J 37/01
[52] U.S. Cl. .............. 99/327; 99/348; 99/468; 366/98; 366/146; 366/314; 366/601
[58] Field of Search ............ 99/325–328, 331–335, 99/348, 467, 468, 483, 484, 486, 352–355; 366/69, 96–98, 144–146, 149, 314, 601; 426/504, 510–512, 523; 219/400, 492, 497

[56] References Cited

U.S. PATENT DOCUMENTS

| 4,538,509 | 9/1985 | Ojima et al. ............................ 99/348 |
| 4,984,512 | 1/1991 | Takahashi et al. ...................... 99/327 |
| 5,076,153 | 12/1991 | Takahashi et al. ................. 366/601 X |
| 5,145,252 | 9/1992 | Oh ......................................... 366/98 |
| 5,146,840 | 9/1992 | Hedenberg ........................... 99/328 |
| 5,363,746 | 11/1994 | Gordon ............................ 99/455 X |
| 5,415,081 | 5/1995 | Yoshida et al. ....................... 99/326 |
| 5,584,230 | 12/1996 | Yoshida et al. ................. 366/314 X |
| 5,628,240 | 5/1997 | Yoshida et al. ................. 99/468 X |
| 5,694,832 | 12/1997 | Kakimoto et al. .................... 99/348 |
| 5,704,277 | 1/1998 | Yung .................................... 99/327 |
| 5,794,521 | 8/1998 | Yung ............................. 366/146 X |
| 5,839,356 | 11/1998 | Dornbush et al. ................... 99/331 |

FOREIGN PATENT DOCUMENTS

| 5-115383 | 5/1993 | Japan . |
| 8-23904 | 1/1996 | Japan . |

Primary Examiner—Timothy Simone
Attorney, Agent, or Firm—Rabin & Champagne, P.C.

[57] ABSTRACT

A cooking machine which has: a cooking vessel removably provided in a case cavity and having an open top; a rotary shaft extending through a bottom of the cooking vessel and having an upper end to be fitted with an agitator blade; a driving mechanism provided below the cooking vessel for rotatively driving the rotary shaft of the cooking vessel; a heater provided in the case cavity for adjusting an ambient temperature within the case cavity; and a steam generating mechanism for supplying steam into the cooking vessel. The cooking machine selectively performs a kneading process for kneading an ingredient put in the cooking vessel, a shaping/fermenting process for allowing an ingredient to expand to a predetermined level in the cooking vessel, a baking process for baking an ingredient, and a steaming process for steaming an ingredient in the cooking vessel.

29 Claims, 16 Drawing Sheets

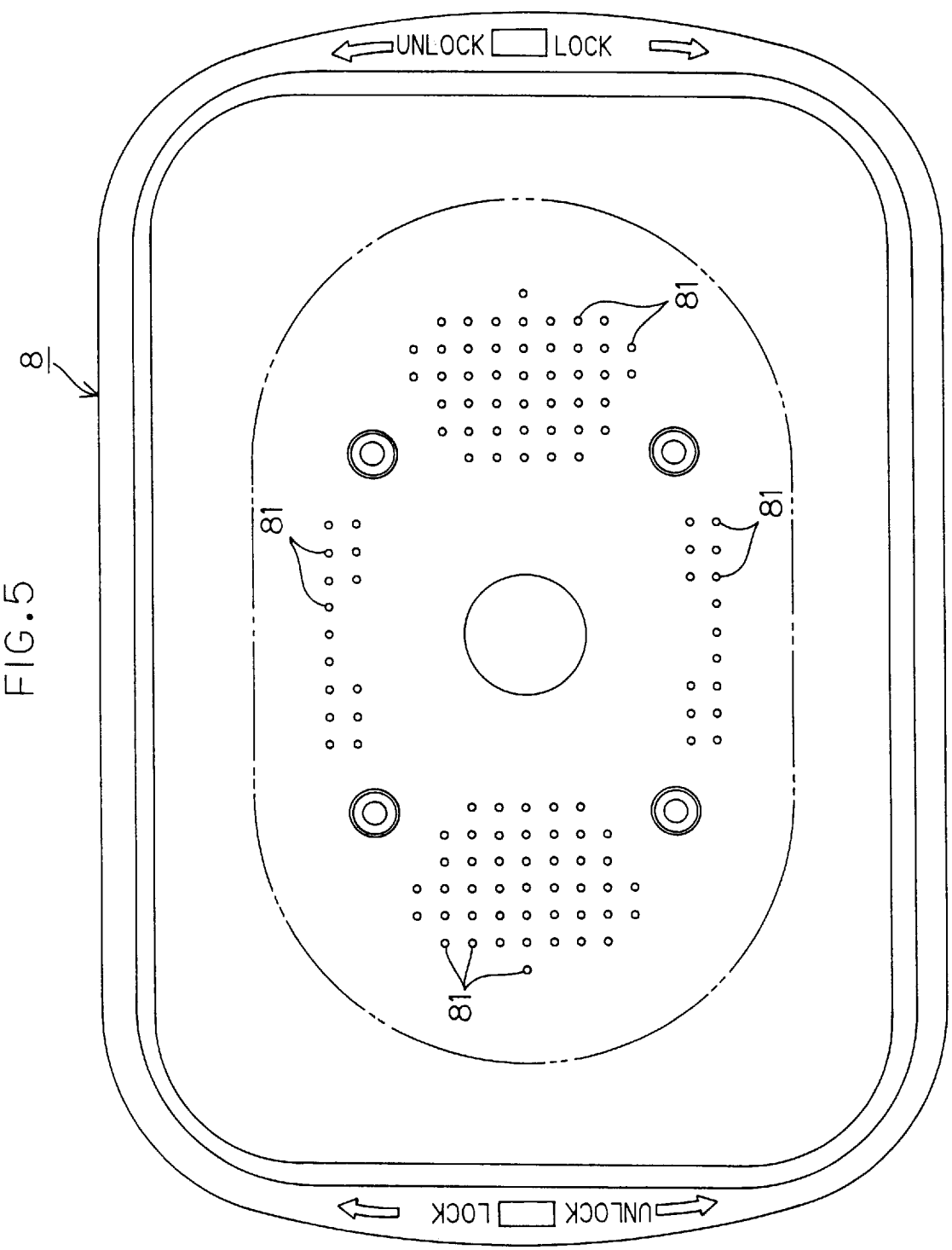

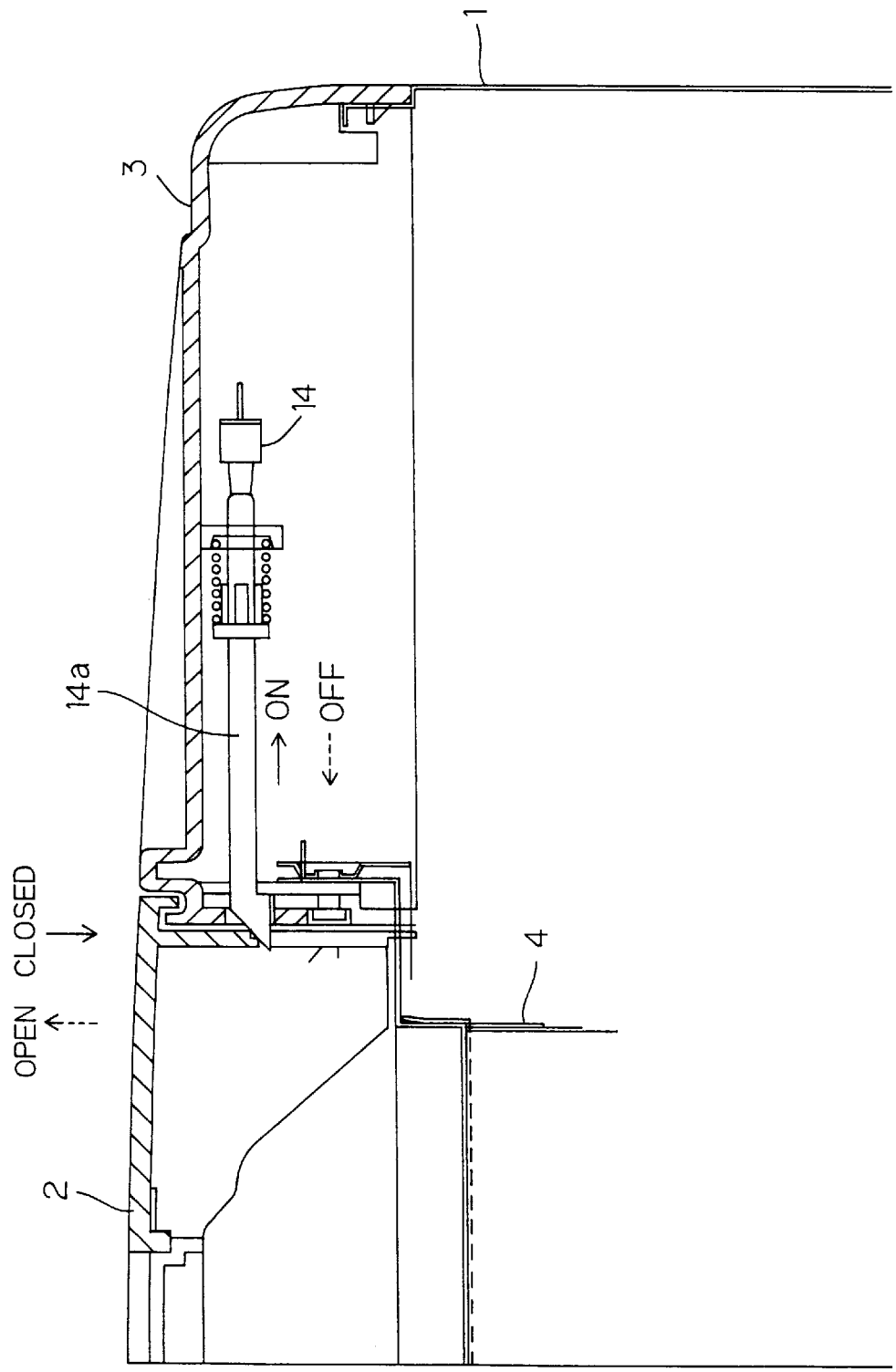

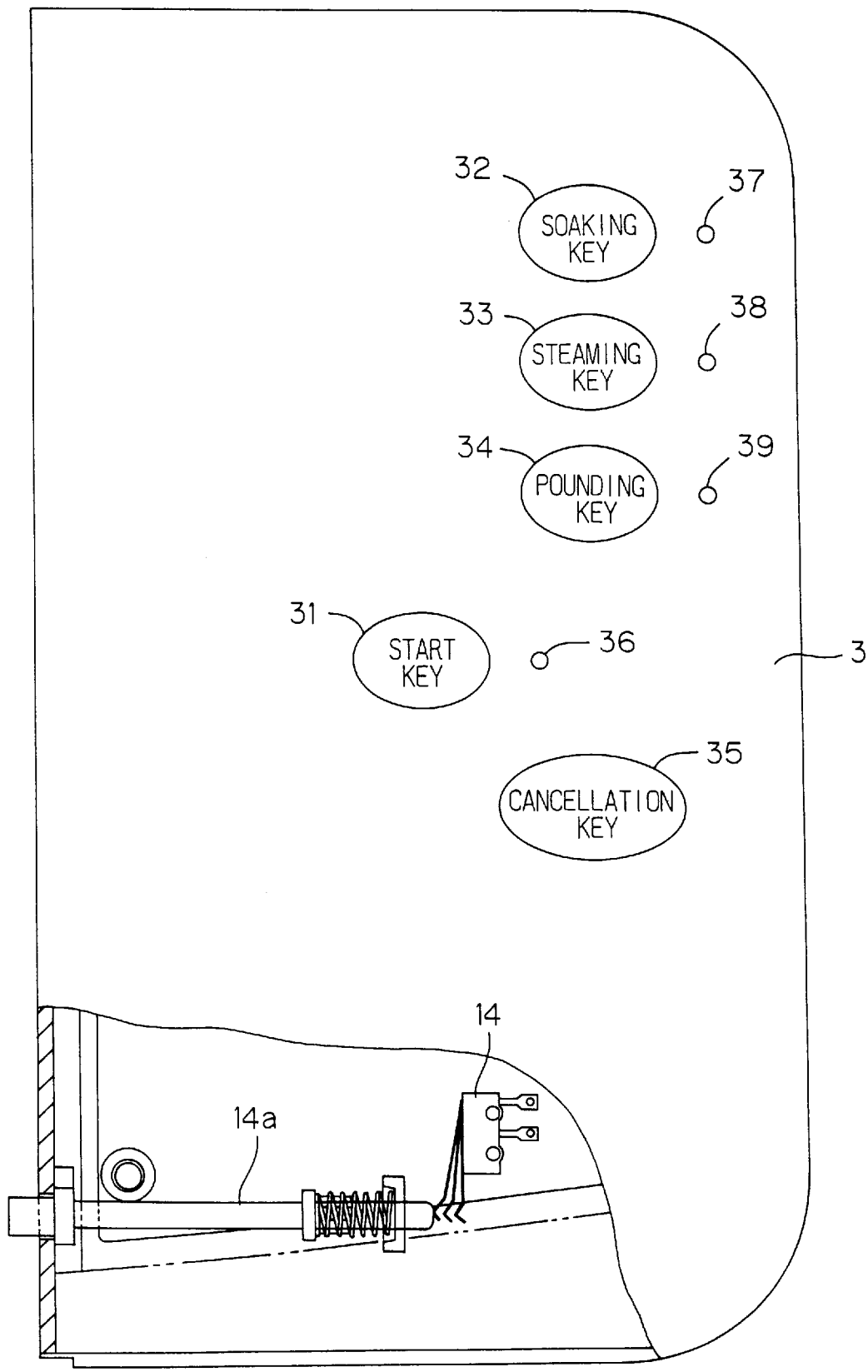

COOKING MACHINE

BACKGROUND OF THE INVENTION

1. Field of the Invention

The present invention relates to a cooking machine having bread making function and a steaming function.

2. Description of Related Art

Various cooking machines such as automatic bread making machines and rice cake making machines have been proposed for automatic production of bread and rice cake.

For example, an automatic bread making machine such as disclosed in Japanese Unexamined Patent Publication No. 5-115383 (1993) is designed so that, when a user presses a start switch after putting bread ingredients (wheat flour, water, yeast and the like) in a vessel called "hopper", a kneading process for kneading the bread ingredients, a shaping/fermenting process for allowing the resulting dough to expend to a predetermined level in the vessel and a baking process for baking the expended dough are automatically performed in sequence.

An automatic rice cake making machine such as disclosed in Japanese Unexamined Patent Publication No. 8-23904 (1996) is designed so that, when a user presses a start switch after glutinous rice rinsed and soaked with a predetermined amount of water has been put in a vessel, a steaming process for steaming the rice and a kneading process for kneading the steamed rice are automatically performed in sequence.

Where a home user has these two types of cooking machines, a large storage space is required. In addition, handling of the cooking machines is very troublesome, because the user has to take a desired one of the cooking machines out of the storage space to use it for cooking.

SUMMARY OF THE INVENTION

It is an object of the present invention to provide a cooking machine which is capable of performing a bread making process and a variety of steam cooking processes.

The cooking machine according to the present invention comprises: a case having a case cavity therein; a cooking vessel removably provided in the case cavity and having an open top; a rotary shaft extending through a bottom of the cooking vessel and having an upper end to be fitted with an agitator blade; a driving mechanism provided below the cooking vessel for rotatively driving the rotary shaft of the cooking vessel; a heating mechanism provided in the case cavity for adjusting an ambient temperature within the case cavity; a steam generating mechanism for supplying steam to the cooking vessel; and management means for controlling operations of the respective components as required to selectively perform a plurality of cooking processes.

In this case, the management means may control the operations of the respective components to selectively perform kneading process for kneading an ingredient put in the cooking vessel, a shaping/fermenting process for allowing an ingredient to expand to a predetermined level in the cooking vessel, a baking process for baking an ingredient, and a steaming process for steaming an ingredient in the cooking vessel.

The management means may perform a bread making process including the kneading process, the shaping/fermenting process and the baking process, and a rice cake making process including the steaming process and the kneading or pounding process.

Further, the management means may selectively perform the bread making process and a steam cooking process.

The cooking machine of the present invention, which has a basic construction as a bread making machine and is additionally provided with the steam generating mechanism, is intended for bread making as well as for steam cooking of glutinous rice, chawan-mushi (pudding-like dish), butaman (bun with minced meat filling) and the like. Thus, the bread making process and the various steam cooking processes can be performed with the single cooking machine.

The steam generating mechanism is preferably disposed below the cooking vessel. Thus, the steam naturally rises to be efficiently supplied to the cooking vessel for efficient steam cooking. More specifically, the steam generating mechanism may be provided between the driving mechanism and the cooking vessel in a bottom portion of the case cavity.

It is preferred that the heating mechanism is also used as a heat source of the steam generating mechanism for the steam generation. Thus, the number of the components can be reduced for cost reduction.

The cooking vessel may have a steam introduction hole formed in the bottom thereof for introduction of the steam generated by the steam generating mechanism, and a cover for switchably opening and closing the steam introduction hole. Alternatively, two cooking vessels may selectively be used depending on a cooking process to be performed, i.e., a steam cooking vessel removably provided in the case cavity and having an open top and a bottom formed with through-holes as steam introduction holes for introduction of the steam generated by the steam generating mechanism, and a bread cooking vessel removably provided in the case cavity and having an open top and a bottom formed with no through-hole.

Thus, the steam cooking process and the bread making process can advantageously be performed.

It is preferred that the steam cooking vessel has a generally rectangular box shape, and a greater number of steam introduction holes are provided in longitudinally opposite portions than in transversely opposite portions of the bottom of the cooking vessel. With this arrangement, the steam can virtually uniformly be supplied into the cooking vessel for efficient steam cooking.

Where the two cooking vessels are adapted for selective use, these cooking vessels preferably have fixtures of the same configuration which are each engageable to a vessel fixing portion provided in the case. Since the fixtures of the cooking vessels to be engaged with the vessel fixing portion have the same configuration, the construction of the cooking machine can be simplified and the production costs can be reduced.

It is preferred that one of the two cooking vessels has a greater exterior size than the other cooking vessel so as to accommodate therein the other cooking vessel. Thus, the two cooking vessels can be accommodated together in the case.

It is preferred that the two cooking vessels each have a rotary shaft extending through the bottom thereof, the rotary shafts of the two cooking vessels being respectively adapted to be fitted with two agitator blades of different configurations which are suitable for specific cooking processes. Thus, the two agitator blades can selectively be used so that an agitating operation can properly be performed depending on an ingredient to be cooked.

It is preferred that the two agitator blades are removably attachable to the corresponding rotary shafts of the two cooking vessels, and engagement portions of the two agitator blades to be engaged with the corresponding rotary shafts of the two cooking vessels are respectively configured so as to allow for exclusive engagement with the corresponding rotary shafts. This arrangement prevents the agitator blades from being attached to the rotary shafts in a wrong way, thereby avoiding a cooking failure.

The management means, which is adapted to selectively perform the bread making process and the steam cooking process, preferably includes cooking vessel identification means for determining, when either of the cooking processes is to be performed, whether or not a proper one of the cooking vessels for the cooking process to be performed is used. Thus, use of an improper cooking vessel for the cooking process can be recognized before the start of the cooking process or at the early stage of the cooking process. Therefore, where the proper cooking vessel is not used, the cooking process is interrupted so that the improper cooking vessel can be replaced with the proper one. Thus, a cooking failure can be avoided.

More specifically, only one of the two cooking vessels is formed with an identification projection so that, when either of the cooking vessels is set in the case cavity, whether or not the cooking vessel thus set is proper can be determined by detecting the identification projection. Since the two cooking vessels are distinguishable from each other by the configurational difference, it is possible to recognize use of the improper cooking vessel before the start of the cooking process to allow for easy countermeasures.

If the bread cooking vessel is mistakenly used for the steam cooking, a pressure buildup may occur due to the steam. Therefore, the cooking machine preferably further comprises a steam release mechanism for releasing the steam into the case cavity when the steam from the steam generating mechanism cannot be supplied into the cooking vessel.

In this case, the cooking machine may further comprise a temperature sensor for sensing the ambient temperature within the case cavity so that whether or not the proper cooking vessel is set in the case cavity can be determined on the basis of an output signal from the temperature sensor. More specifically, whether or not the proper cooking vessel is set in the case cavity can be determined on the basis of the cooking process to be performed in accordance with a cooking request and the temperature sensed by the temperature sensor after a lapse of a predetermined period from the start of the cooking vessel. If the steam cooking vessel is mistakenly used for the bread making process, for example, bread ingredients will leak out of the steam cooking vessel from the through-holes thereof at the initial stage of the bread making process, so that the vessel will be heated in an empty state at a baking stage. Therefore, the ambient temperature within the case will rise in a shorter time at the baking stage. On the other hand, if the bread cooking vessel is mistakenly used for the steam cooking, the ambient temperature within the case will rise to a higher level than in the normal case due to the steam released into the case after a lapse of a predetermined time period from the start of the steam cooking. In either case, the temperature within the case will rise faster than in the normal case. By detecting this phenomenon by means of the temperature sensor, the use of the improper cooking vessel can be detected at the early stage of the cooking process.

Where a lid is provided for opening and closing the open top of the case, the cooking machine preferably further comprises a lid state sensing mechanism for sensing the state of the lid, and the steam cooking process or the bread making process is preferably prohibited depending on the open/close state of the lid.

More specifically, it is preferred to prohibit the steam cooking process when the lid is closed. Thus, the steam cooking process is performed with the lid being open to prevent the steam from being confined in the case cavity.

Thus, the electric system of the cooking machine can be protected from the steam, so that reliability of the cooking machine can be improved.

It is preferred to prohibit the bread making process when the lid is open. This prevents the bread ingredients from scattering out of the cooking machine and prevents foreign matters such as dust from intruding into the cooking vessel during the bread making process.

The foregoing and other objects, features and effects of the present invention will become more apparent from the following description of the preferred embodiments with reference to the attached drawings.

BRIEF DESCRIPTION OF THE DRAWINGS

FIG. 5 is a plan view of the rice cake cooking vessel;

FIG. 7 is an enlarged sectional view illustrating a peripheral portion of an operation/display panel of the cooking machine;

FIG. 8 is a plan view illustrating partially in section the operation/display panel of the cooking machine;

DESCRIPTION OF THE PREFERRED EMBODIMENTS

Figure 1:
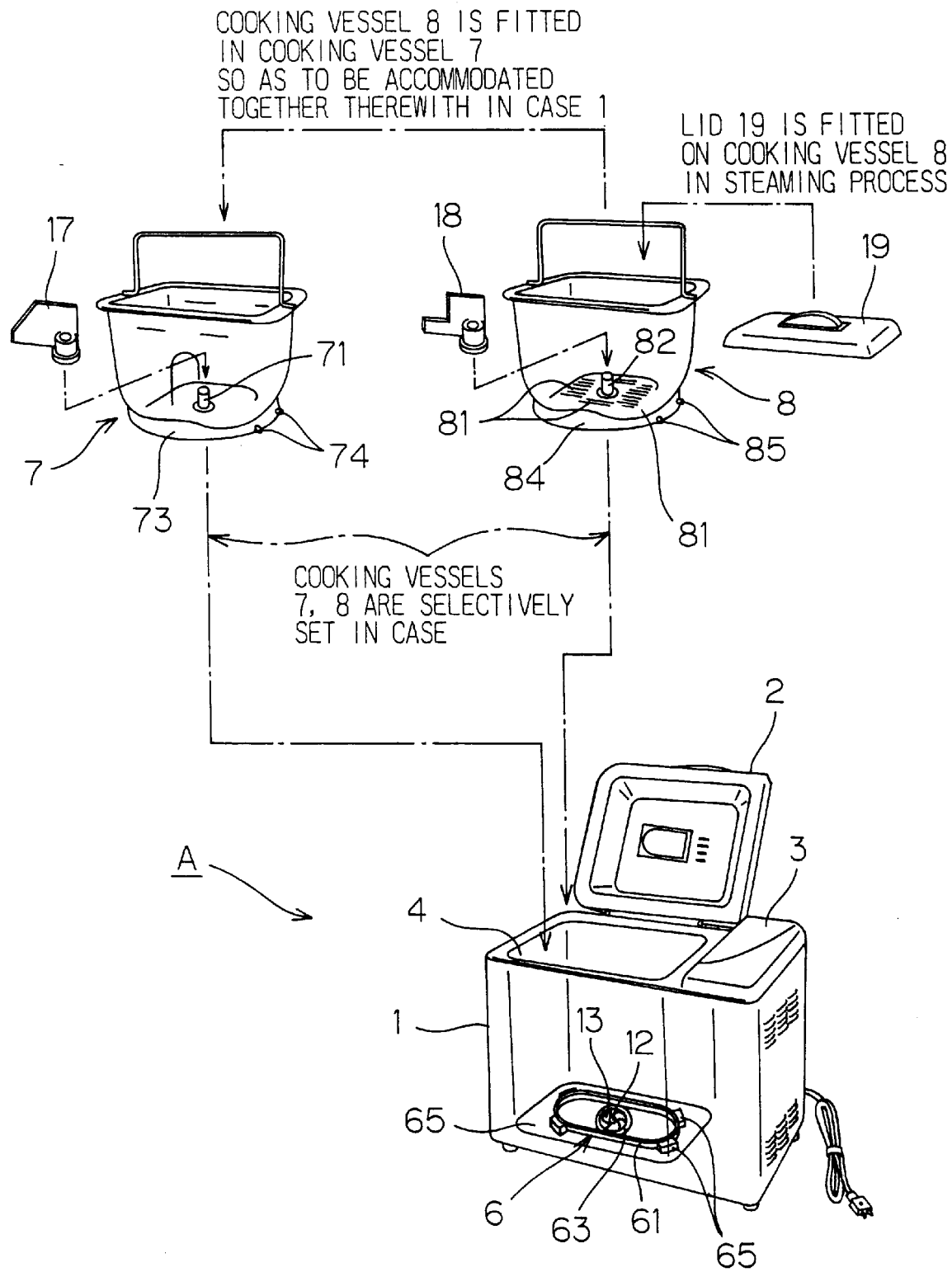
FIG. 1 is a perspective view illustrating the appearance of a cooking machine according to one embodiment of the present invention.
Figure 2:
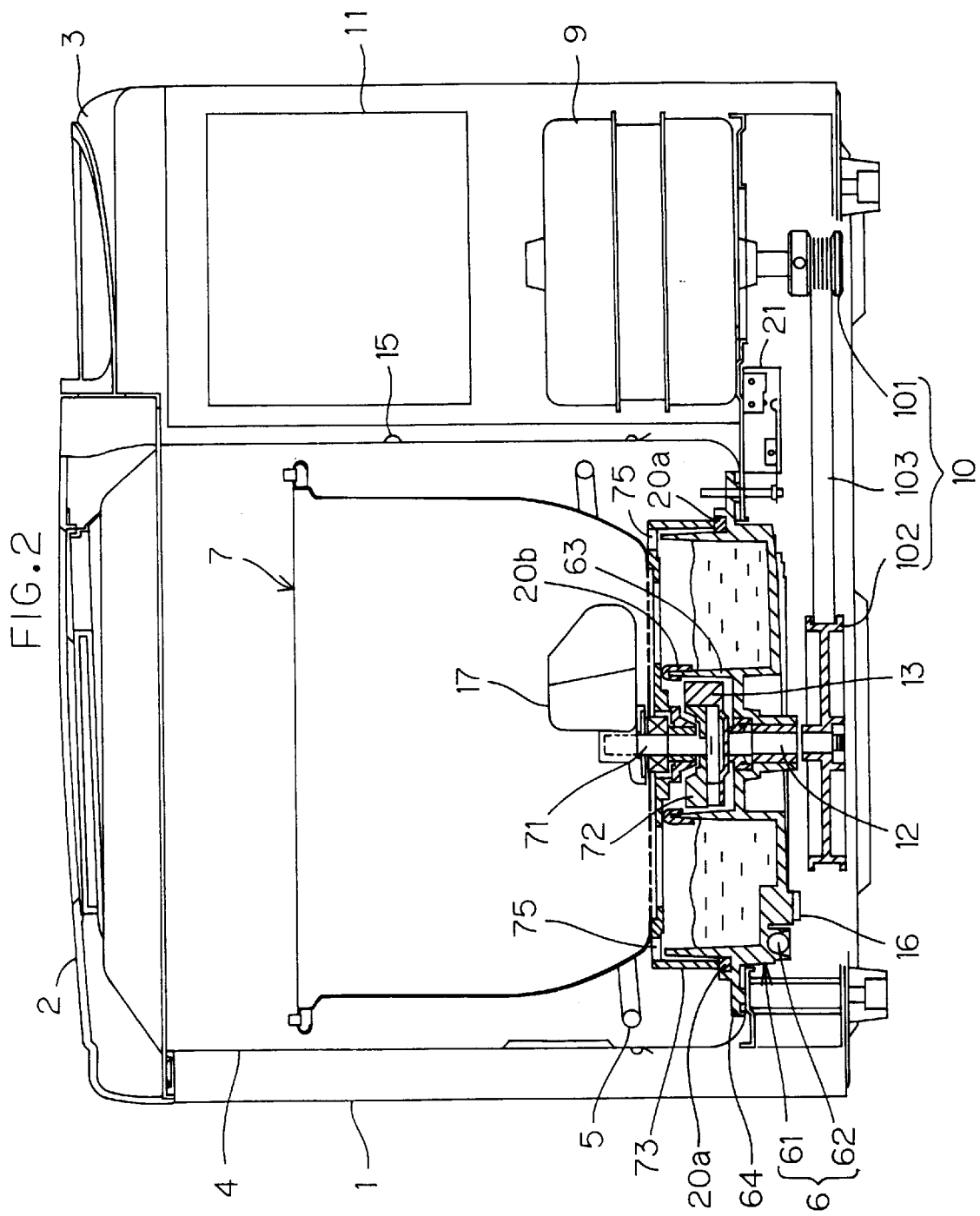
FIG. 2 is a vertical sectional front view illustrating the cooking machine with a bread cooking vessel being set therein.
Figure 3:
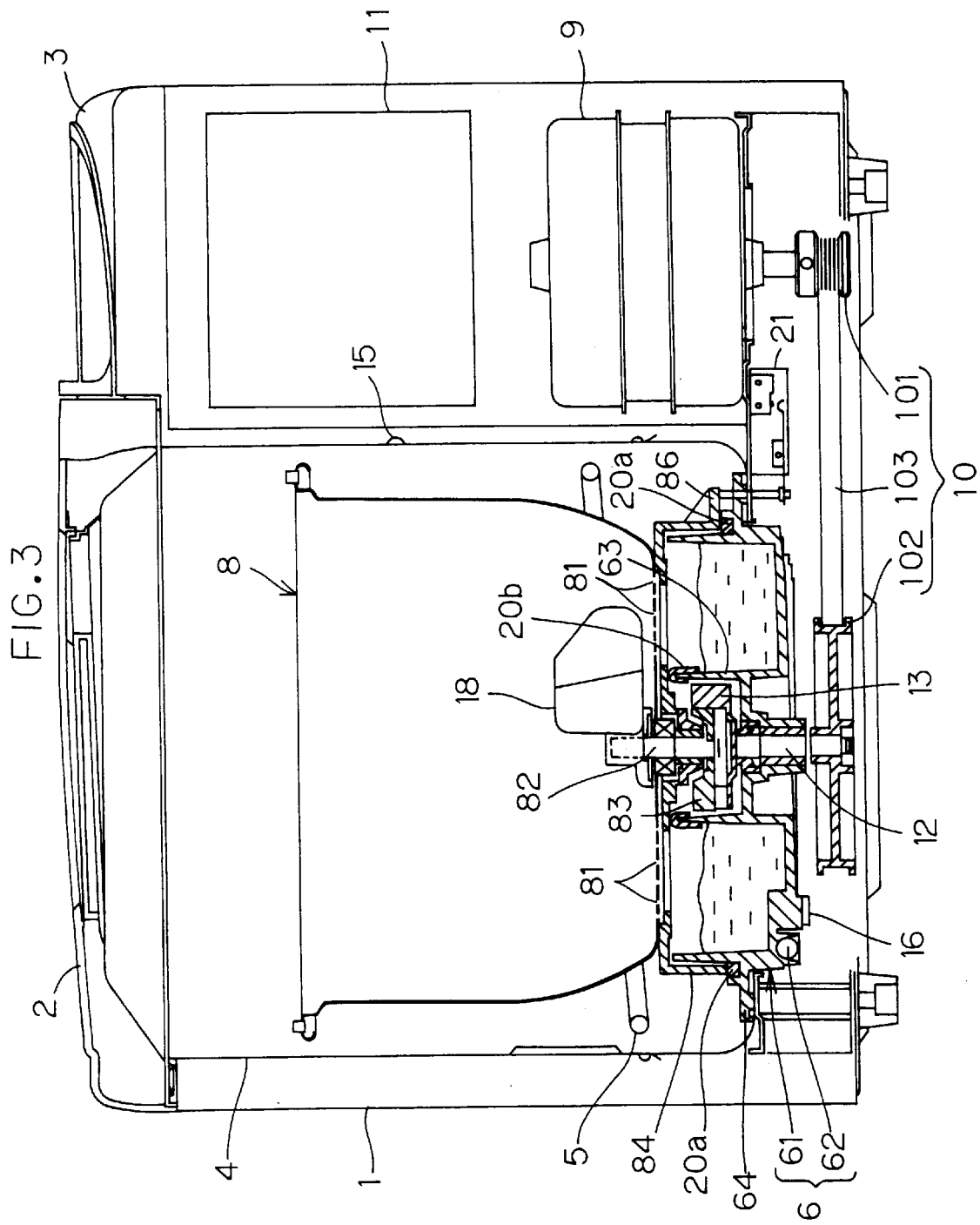
FIG. 3 is a vertical sectional front view illustrating the cooking machine with a rice cake cooking vessel being set therein.
Figure 4:
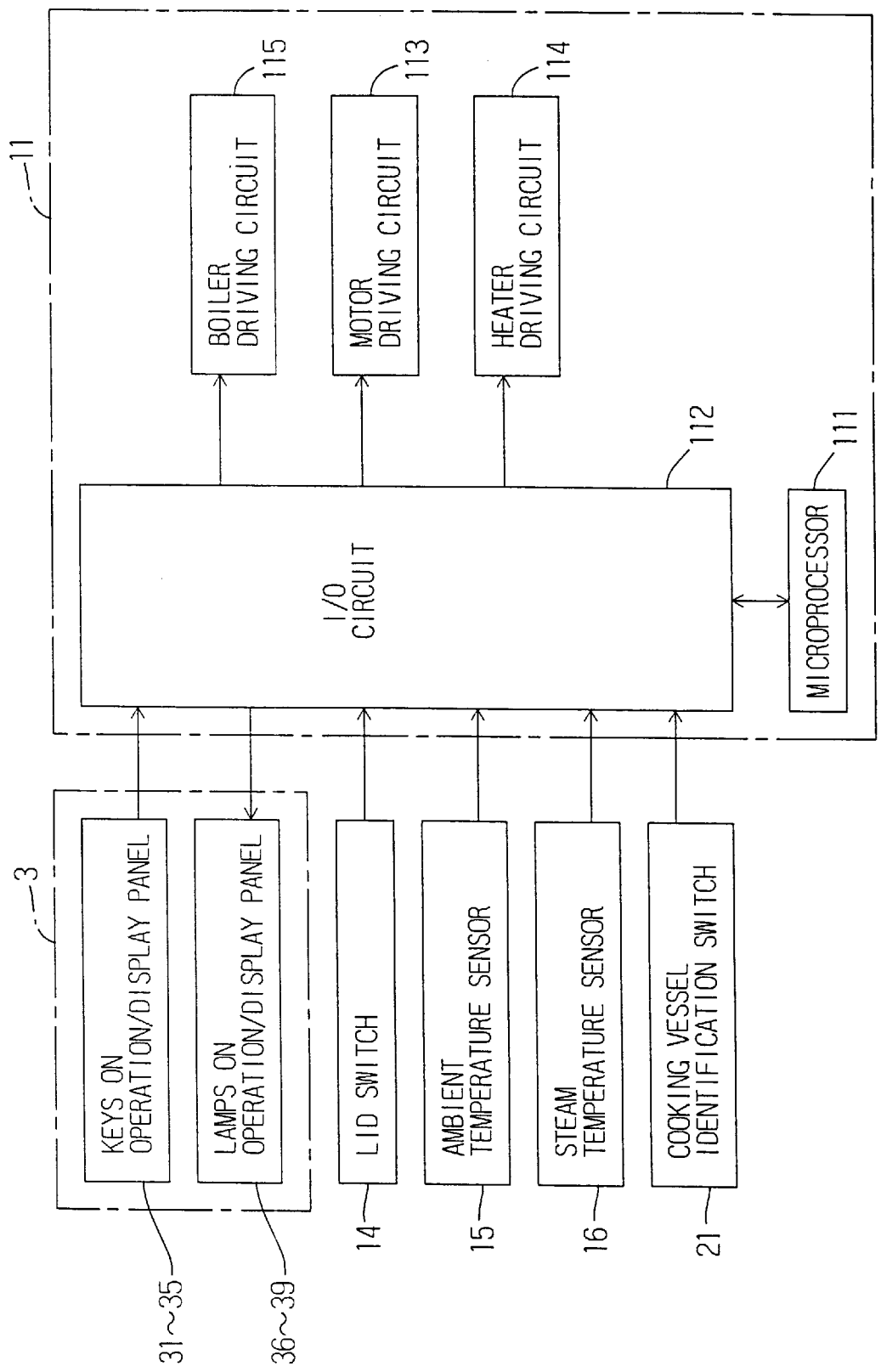
FIG. 4 is a block diagram illustrating the electrical construction of the cooking machine.
Figure 6A:
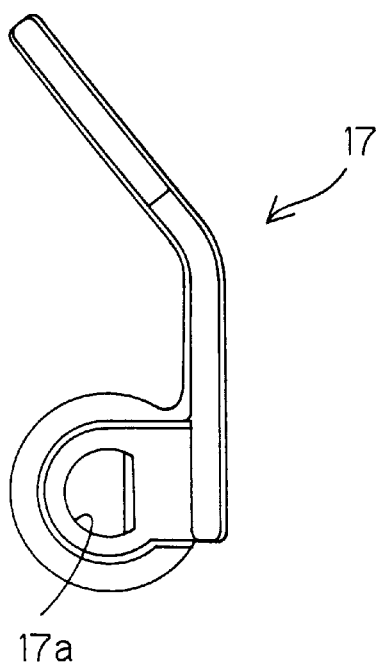
FIGS. 6A and 6B are plan views of agitator blades.
Figure 6B:
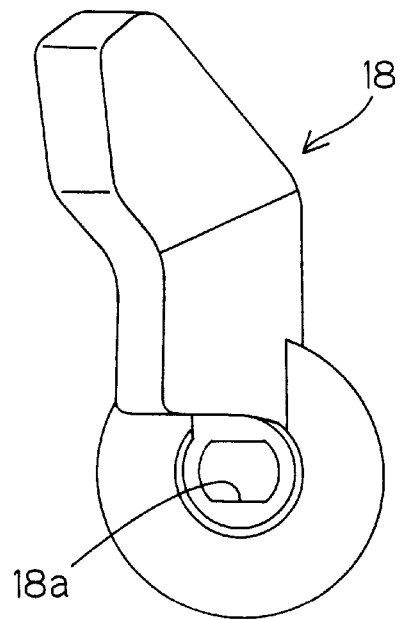
Figure 9:
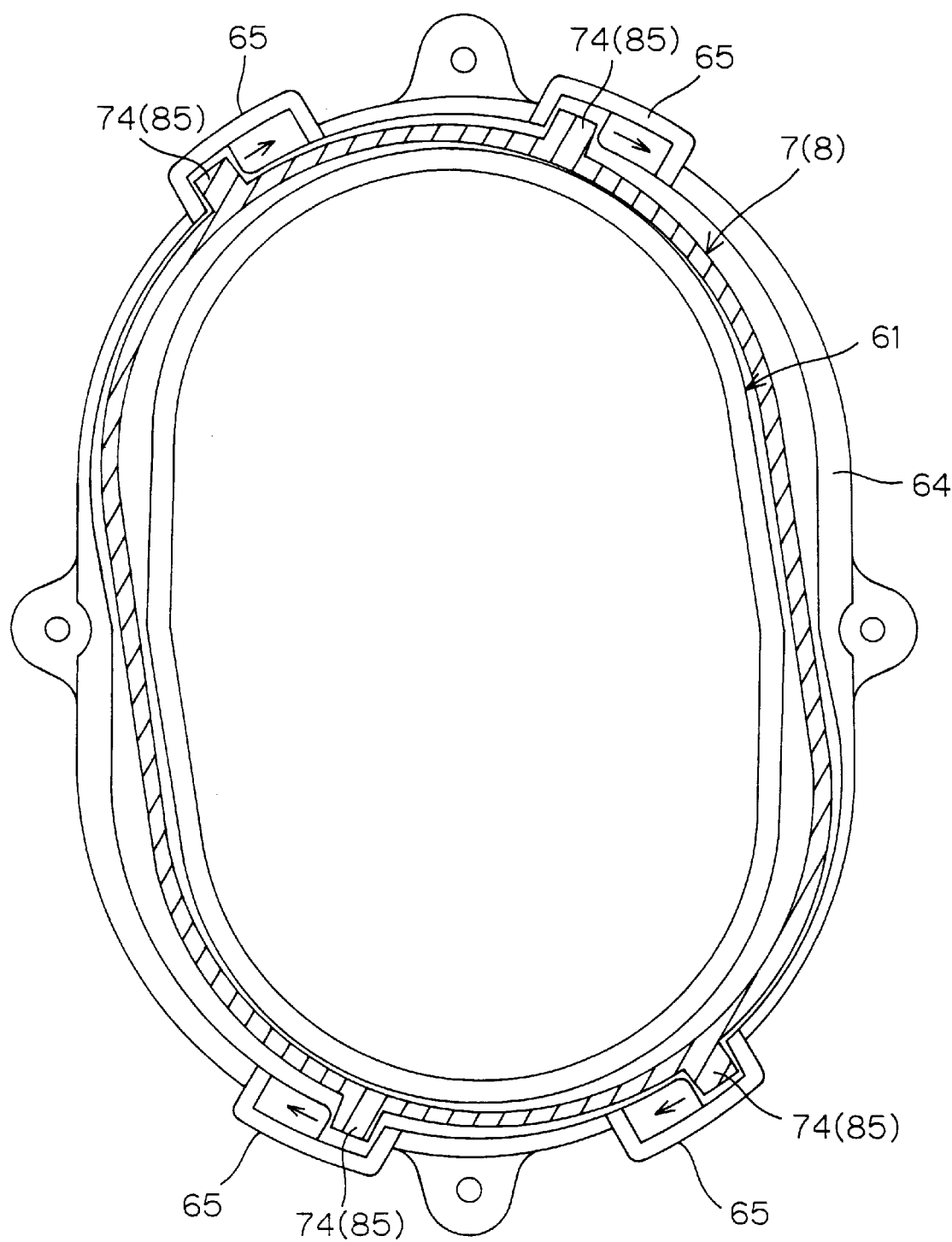
FIG. 9 is an explanatory diagram illustrating an unlocked state of a cooking vessel.
Figure 10:
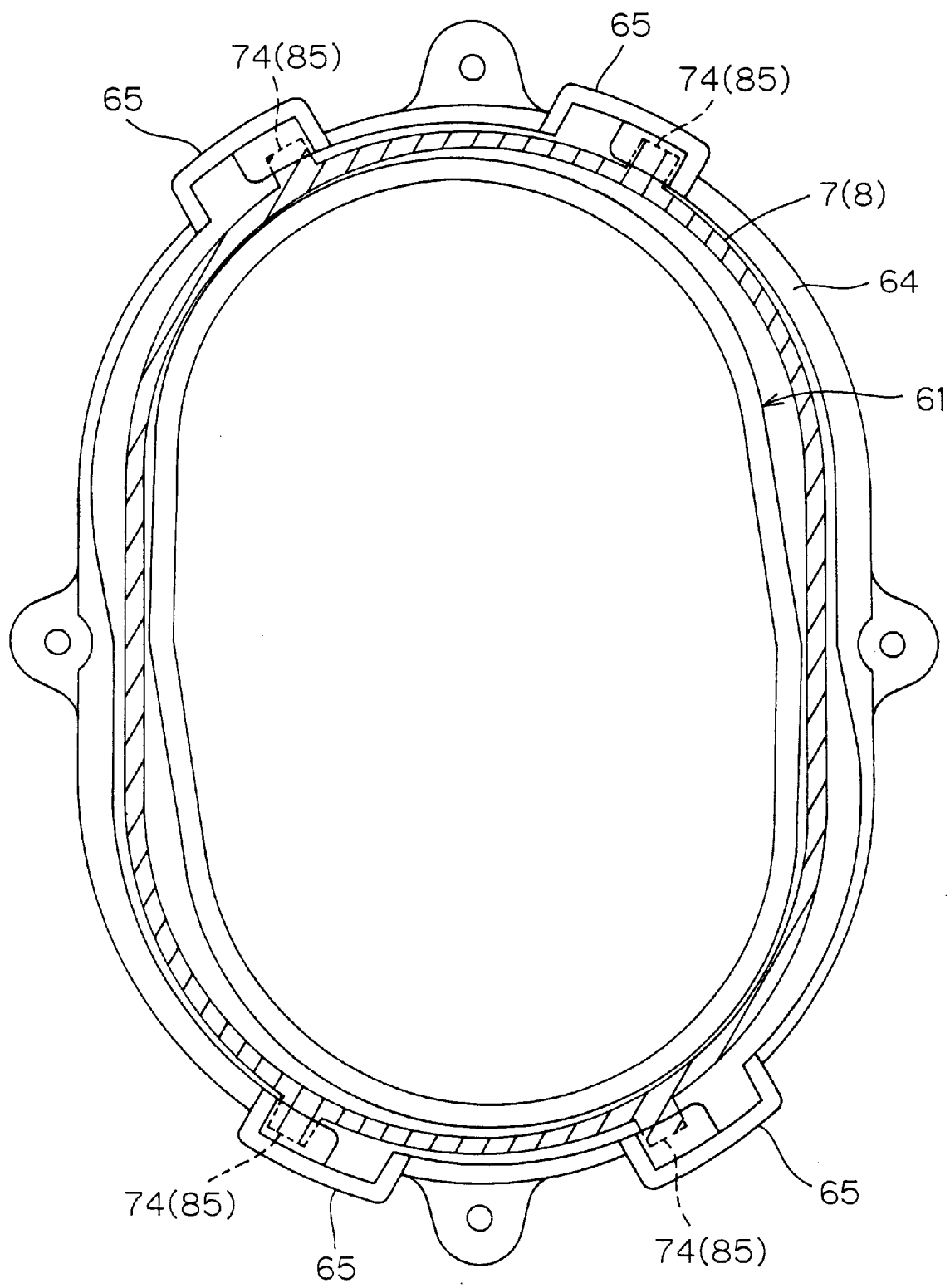
FIG. 10 is an explanatory diagram illustrating a locked state of the cooking vessel.
Figure 11:
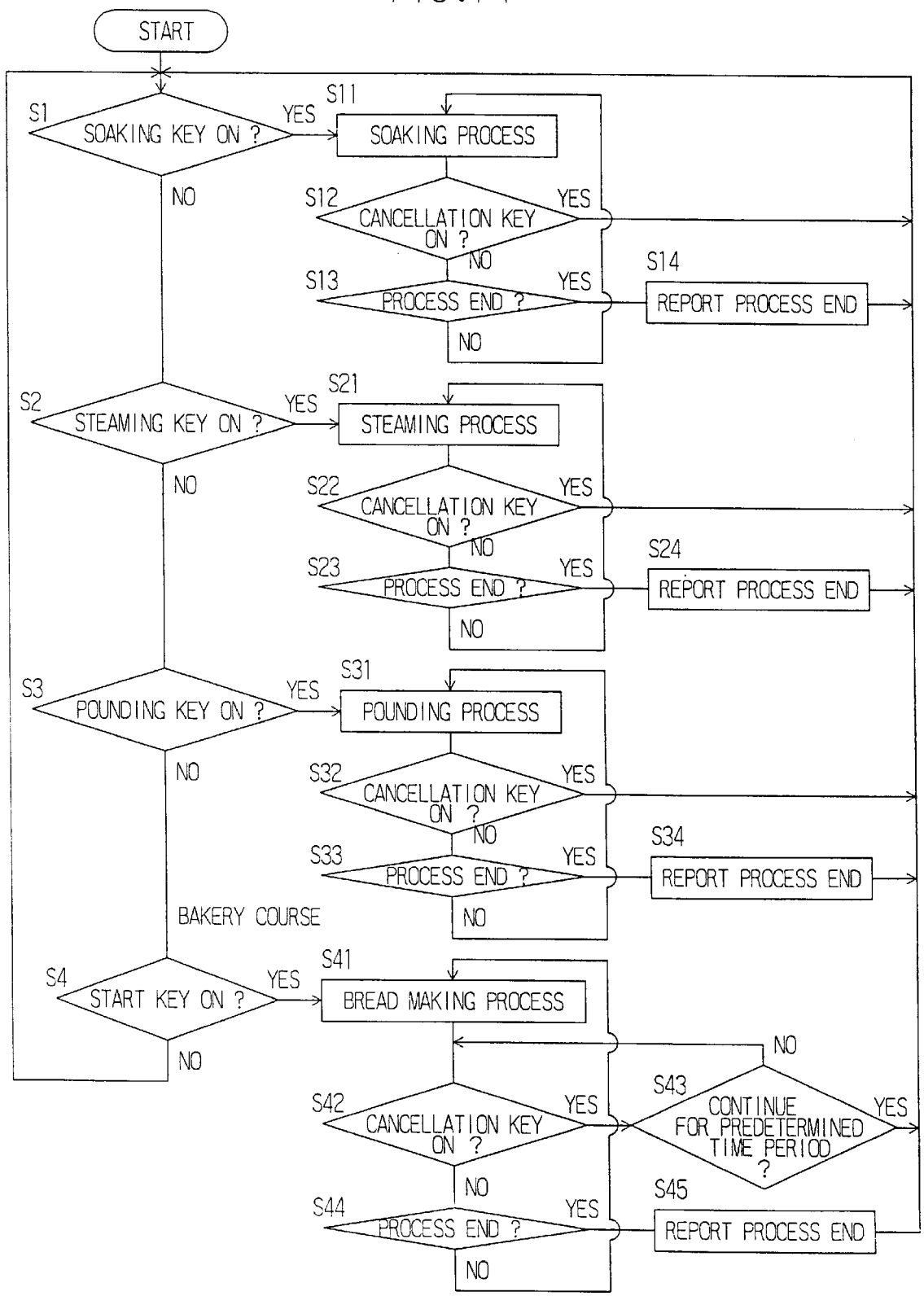
FIG. 11 is a flow chart for explaining the operation of the cooking machine.

One embodiment of the present invention will hereinafter be described with reference to FIGS. 1 through 11. FIG. 1 is a perspective view illustrating the appearance of a cooking machine. FIG. 2 is a vertical sectional front view illustrating the cooking machine with a bread cooking vessel being set therein. FIG. 3 is a vertical sectional front view illustrating the cooking machine with a rice cake cooking vessel being set therein. FIG. 4 is a block diagram illustrating the electrical construction of the cooking machine. FIG. 5 is a top plan view of the rice cake cooking vessel. FIGS. 6A and 6B are top plan views of agitator blades. FIG. 7 is an enlarged sectional view illustrating a peripheral portion of an operation/display panel. FIG. 8 is a plan view illustrating partially in section the operation/display panel. FIG. 9 is an explanatory diagram illustrating a state of a cooking vessel unlocked to a boiler water vessel. FIG. 10 is an explanatory diagram illustrating a state of the cooking vessel locked to the boiler water vessel. FIG. 11 is a flow chart for explaining the operation of the cooking machine.

In FIGS. 1 through 11, there are shown a cooking machine A, a case 1, a lid 2, an operation/display panel 3, a baking chamber 4, a baking heater 5, a boiler 6 as steam generating mechanism, two types of cooking vessels 7, 8 generally called "hoppers", a motor 9, a power transmission unit 10, and a control unit 11.

The case 1 is of a generally rectangular box shape, and has a top opening which occupies about two thirds of the top face along the length thereof. The lid 2 is provided on the top opening so as to be upwardly openable. A lid switch 14 for sensing the open/close state of the lid 2 is provided adjacent the top opening of the case 1. As shown in FIGS. 7 and 8, the lid switch 14 is in an ON state when the lid 2 is closed to press a displaceable pin 14a, and in an OFF state when the lid 2 is opened to return the displaceable pin 14a.

The operation/display panel 3 is provided on the top face of the case 1 as occupying the remaining about one third of the top face, and variety of keys and lamps are arranged on the panel 3. The keys include a start key 31 to be pressed for starting an automatic operation for a bread making process, a soaking key 32 to be pressed when glutinous rice is soaked in water, a steaming key 33 to be pressed when the glutinous rice is steamed, a pounding key 34 to be pressed when the steam glutinous rice is pounded, and a cancellation key 35. The lamps include a bread making operation lamp 36 to be lit or unlit in accordance with the on/off operation of the start key 31, a soaking lamp 37 to be lit or unlit in accordance with the on/off operation of the soaking key 32, a steaming lamp 38 to be lit or unlit in accordance with the on/off operation of the steaming key 33, and a pounding lamp 39 to be lit or unlit in accordance with the on/off operation of the pounding key 34.

The baking chamber 4 is defined in the case in association with the top opening of the case for creating an atmosphere for bread dough baking. An ambient temperature sensor 15 for sensing an ambient temperature within the baking chamber 4 is provided on a side wall of the baking chamber 4.

The baking heater 5 is provided along an interior surface of the side wall of the baking chamber 4 adjacent the bottom thereof.

The boiler 6 includes an open top water vessel 61 having an oval shape as viewed in plan and provided on the bottom of the baking chamber 4, and a heater 62 provided circumferentially of the bottom of the water vessel 61 for evaporating water in the water vessel 61. The water vessel 61 has a cylindrical wall 63 which is provided at the center thereof and has a horizontal wall provided in a vertically middle position of the cylindrical wall 63, and a spindle 12 vertically extends through the horizontal wall in a rotatable manner. A drive gear 13 is fixed to an upwardly projecting end portion of the spindle 12. A steam temperature sensor 16 for sensing a steaming temperature is provided on an exterior bottom surface of the water vessel 61 of the boiler 6.

The two cooking vessels 7, 8 are each removably set on top of the boiler 6 within the baking chamber 4. One of the cooking vessels 7, 8 is used for the bread making process, and the other cooking vessel is used for a rice cake making process and a steam cooking process.

The motor 9 is provided below the operation/display panel 3 within the case 1, and rotatively drives the spindle 12 of the boiler 6 via the power transmission unit 10.

The power transmission unit 10 is disposed over a large area of the bottom of the case 1. The power transmission unit 10 is adapted to transmit a torque of the motor 9 to the spindle 12, and includes a pulley 101 fixed to an output shaft of the motor 9, a pulley 102 attached to a lower end of the spindle 12, and an endless belt 103 entrained around the pulleys 101, 102.

The control unit 11 is provided between the operation/display panel 3 and the motor 9 within the case 1 for controlling operations for the bread making process and the rice cake making process. The control unit 11 includes a microprocessor 111 comprising a CPU, a ROM and a RAM, an I/O circuit 112, a motor driving circuit 113, a heater driving circuit 114, and a boiler driving circuit 115. The microprocessor 111 corresponds to management means and cooking vessel identification means.

Of the two cooking vessels 7, 8, the rice cake cooking vessel 8 has a plurality of steam introduction holes 81 vertically extending through the bottom thereof, while the bread cooking vessel 7 has no steam introduction hole in the bottom thereof. This is a major difference between the two cooking vessels 7, 8. As shown in FIG. 1, the rice cake cooking vessel 8 has a lid 19 removably provided on the open top thereof as an accessory thereof. The lid 19 is used in the steam cooking process.

These cooking vessels 7, 8 each have a generally rectangular box shape which can accommodate 1.5 loaves of bread. The rice cake cooking vessel 8 is one size smaller than the bread cooking vessel 7 so as to be accommodated in the bread cooking vessel 7. Where the cooking vessels 7, 8 are each thus configured in a rectangular box shape, the steam introduction holes 81 of the rice cake cooking vessel 8 are preferably arranged, for uniform steam introduction, so that a greater number of steam introduction holes are provided in longitudinally opposite portions than in transversely opposite portions of the bottom of the cooking vessel as shown in FIG. 5.

In other words, the total open area of the steam introduction holes 81 arranged in the longitudinally opposite portions of the cooking vessel bottom is greater than the total open area of the steam introduction holes 81 arranged in the transversely opposite portions of the cooking vessel bottom, whereby the steam can more uniformly be introduced into the cooking vessel 8.

The cooking vessels 7 and 8 have rotary shafts 71 and 82, respectively, which vertically extend through central portions thereof. Agitator blades 17 and 18 are removably attached to upwardly projecting end portions of the rotary shafts 71 and 82, respectively, for kneading bread ingredients and rice cake ingredients. Driven gears 72 and 83 are attached to downwardly projecting end portions of the rotary shafts 71 and 82, respectively, which are to be brought into meshing engagement with the drive gear 13 of the spindle 12.

Seats 73 and 84 are provided on exterior bottom surfaces of the cooking vessels 7 and 8, respectively, for fixing the cooking vessels 7 and 8 to the water vessel 61 of the boiler 6. The seats 73, 84 are each adapted to be fitted on the open top of the water vessel 61 of the boiler 6 and serve as a lid for sealing the water vessel 61.

As shown in FIGS. 9 and 10, four engagement tabs 74 (85) are provided on longitudinally opposite exterior side surfaces of the seat 73 (84) of the cooking vessel 7 (8) (two tabs on each side face), and engagement portions 65 to be engaged with the engagement tabs 74 (85) are formed in longitudinally opposite upper surface portions of a base 64 of the water vessel 61 of the boiler 6 for firmly fixing the cooking vessel 7 (8) to the boiler 6 within the baking chamber 4. When the cooking vessel 7 (8) is to be fixed to the boiler 6, the seat 73 (84) of the cooking vessel 7 (8) is rested on the water vessel 61 of the boiler 6 with the engagement tabs 74 (85) being engaged with the engagement portions 65, and then the cooking vessel 7 (8) is slightly turned in a predetermined direction (clockwise as seen in FIG. 9). Thus, the engagement tubs 74 (85) are locked to the engagement portions 65. For this lock arrangement, the seats 73 and 84 each have a greater outer size than the water vessel 61. To seal the water vessel 61 of the boiler 6 with the seat 73 (84) of the cooking vessel 7 (8), a lower peripheral edge of the seat 73 (84) is pressed against a packing 20a fitted around the base 64 of the water vessel 61, and, in the central region, a lower surface of the seat 73 (84) is pressed against a packing 20b fitted around the top edge of the cylindrical wall 63.

When the bread cooking vessel 7 is mistakenly used in the rice cake making process, there is a possibility that the inside pressure of the boiler 6 increases due to the steam generated by the boiler 6, because no steam introduction hole 81 is formed in the bottom of the bread cooking vessel 7 unlike the rice cake cooking vessel 8. Therefore, the bread cooking vessel 7 has steam release holes 75 formed in the seat 73 thereof as shown in FIG. 2.

The rice cake cooking vessel 8 has an identification projection 86 outwardly projecting from a side wall portion of the seat 84 as shown in FIG. 3. Conversely, the bread cooking vessel 7 has no identification projection. A cooking vessel identification switch 21 which is to be turned on by the identification projection 86 of the rice cake cooking vessel 8 is provided in a predetermined position on the bottom of the baking chamber 4 in association with the identification projection 86.

The agitator blades 17 and 18 for the bread making and for the rice cake making, respectively, have different shapes as shown in FIGS. 6A and 6B in consideration of the kneadability of ingredients. Since it is not acceptable that the differently shaped agitator blades 17, 18 are attached to the cooking vessel 7, 8 in a wrong way, shaft insertion holes 17a and 18a of the agitator blades 17 and 18 to be respectively engaged with the upper end portions of the rotary shafts 71 and 82 of the cooking vessels 7 and 8 have different cross sectional configurations in this embodiment. More specifically, the shaft insertion hole 17a of the agitator blade 17 for the bread making and the rotary shaft 71 of the cooking vessel 7 are semicircular in cross section, while the shaft insertion hole 18a of the agitator blade 18 for the rice cake making and the rotary shaft 82 of the cooking vessel 8 are oval in cross section.

The operation of the cooking machine A described above will hereinafter be explained with reference to a flow chart as shown in FIG. 11.

After the power is turned on, the cooking machine is kept on standby until any of the start key 31, the soaking key 32, the steaming key 33 and the pounding key 34 in the operation/display panel 3 is operated in Steps Si to S4. That is, the cooking machine is on standby for a cooking request.

A user presses a start key 31 for the bread making process, and presses the soaking key 32, the steaming key 33 and the pounding key 34 in this order at predetermined time intervals for the rice cake making process. At this time, the bread cooking vessel 7 should be set in the baking chamber 4 for the bread making process, and the rice cake cooking vessel 8 should be set in the baking chamber 4 for the rice cake making process.

(a) When the start key 31 is operated, an automatic operation for the bread making process is performed in Steps S41 through S45. In this case, a user should preliminarily put bread dough ingredients (wheat flour, water, yeast and the like) in the bread cooking vessel 7. In the automatic bread making operation, a kneading process, a primary fermenting process, a degassing process, a dough resting process, a dough rounding process, a shaping/fermenting process, a baking process and a warming process are sequentially performed in this order.

In the kneading process, the motor 9 is driven to be turned on and off at predetermined time intervals for 5 minutes, and then continuously driven for 20 minutes to rotate the agitator blade 17 for kneading the bread dough. In the primary fermenting process, the ambient temperature within the baking chamber 4 is kept at 30° C. for 40 minutes by means of the baking heater 5. In the degassing process, the motor 9 is continuously driven for 10 seconds to rotate the agitator blade 17 for degassing of the bread dough. In the dough resting process, the ambient temperature within the baking chamber 4 is kept at 30° C. for 25 minutes by means of the baking heater 5. In the dough rounding process, the motor 9 is continuously driven for 15 seconds to rotate the agitator blade 17 for rounding the bread dough. In the shaping/fermenting process, the ambient temperature within the baking chamber 4 is kept at 30° C. for a proper time period (30 to 70 minutes) by means of the baking heater 5. In the baking process, the ambient temperature within the baking chamber 4 is kept at 125° C. for 40 minutes by means of the baking heater 5. In the warming process, the ambient temperature within the baking chamber 4 is slowly lowered to 80 ° C. from the baking temperature. At this time, the baking heater 5 is turned on and off for 60 minutes at the maximum.

(b) When the soaking key 32 is operated, a soaking process is performed in Steps Sil through S14, in which glutinous rice is immersed in water for a predetermined time period to be soaked with a necessary amount of water. In this case, the user should preliminarily rinse the glutinous rice with water, and put the glutinous rice and a predetermined amount of water in the bread cooking vessel 7.

(c) When the steaming key 33 is operated, a steaming process is performed in Steps S21 through S24, in which the boiler 6 is operated to steam the water-soaked glutinous rice typically obtained in the aforesaid process (b). In this case, the user should preliminarily put the water-soaked glutinous rice in the rice cake cooking vessel 8, and pour a predetermined amount of water into the water vessel 61 of the boiler 6. This steaming process can be applied to the rice cake making as well as general steam cooking for chawan-mushi (pot-steamed hotchpotch), butaman (meat bun) and the like.

(d) When the pounding key 34 is operated, a pounding process is performed in Steps S31 through S34, in which the agitator blade 18 of the cooking vessel 8 is rotatively driven by the motor 9 via the power transmission unit 10 to pound the steamed glutinous rice within the cooking vessel 8 in substantially the same manner as in the kneading process for the bread making.

Thus, the bread making process, the rice cake making process and the steam cooking process can conveniently be performed with the use of the single cooking machine A.

As apparent from Steps Si through S4, during implementation of any one of the aforesaid processes (a) to (d), any signals outputted by key operations for the other processes are rejected. This prevents the microprocessor 111 from being brought into confusion which may otherwise occur due to the signals inputted by the key operations during the implementation of the one process.

When the cancellation key 35 is operated to input an interruption signal to the microprocessor during the implementation of the process (a) to (d), the interruption signal is detected in Step S12, S22, S32 or S42, and the process being currently performed is interrupted for termination. In the process (a), however, the responsiveness to the operation of the cancellation key 35 is reduced in consideration of erroneous operation of the key in Step S43. For example, the interruption signal is outputted to interrupt the bread making process, only when the cancellation key 35 is continuously pressed for a predetermined relatively long reference period (e.g., 5 seconds). Even if the cancellation key 35 is pressed for a period shorter than the reference period, the interruption signal is rejected so that the bread making process is continued. This is because, if the automatic operation for the bread making process was interrupted in quick response to inadvertent momentary operation of the cancellation key 35, all the preceding operation would come to nothing so that the bread making process would have to be performed from the start. In this embodiment, it is confirmed that the user really wants to cancel the bread making process. On the contrary, the processes (b) to (d) are independent of each other and, even if the processes are interrupted, it is easy to restore the processes any inconvenience. Therefore, the responsiveness to the operation of the cancellation key 35 is set high in the processes (b) to (d). That is, when the cancellation key 35 is operated momentarily (e.g., for 32 milliseconds) during the process (b) to (d), the interruption signal is inputted and, in response thereto, the process is interrupted.

In the process (a), it is judged whether or not the lid 2 is closed, on the basis of an output signal from the lid switch 14 prior to the start of the process to prevent scattering of the ingredients outside the cooking machine A and contamination with foreign matters such as dust. In the normal state with the lid 2 being closed, the process is started. In the abnormal state with the lid 2 being open, the cooking machine does not start the process, but is kept on standby while beeping to warn the user to close the lid 2. In the process (c) or (d), it is judged whether or not the lid 2 is open, on the basis of an output signal from the lid switch 14 prior to the start of the process to prevent the steam from being confined in the case, particularly in the baking chamber 4 and in a space in which the control unit 10 is accommodated. In the normal state with the lid 2 being open, the process is started. In the abnormal state with the lid 2 being closed, the cooking machine A does not start the process, but is kept on standby while beeping to warn the user to open the lid 2.

In any of the processes (a) to (d), it is judged whether or not a proper cooking vessel 7, 8 for the process is set in the baking chamber 4, before the start of the process. More specifically, where the bread making process (a) is to be performed, it is judged whether or not the cooking vessel identification switch 21 is off. If the switch 21 is off, i.e., if the bread cooking vessel 7 is set in the baking chamber 4, it is judged that the cooking vessel set in the baking chamber 4 is proper, and the process is started. If the switch 21 is on, i.e., if the rice cake cooking vessel 8 is set in the baking chamber 4, it is judged that the cooking vessel set in the baking chamber 4 is improper, and the cooking machine A interrupts the process while beeping to warn the user for replacement of the cooking vessel. On the other hand, where any of the processes (b) to (d) for the rice cake making is to be performed, it is judged whether or not the cooking vessel identification switch 21 is on. If the switch 21 is on, i.e., if the rice cake cooking vessel 8 is set in the baking chamber 4, it is judged that the cooking vessel set in the baking chamber 4 is proper, and the process is started. If the switch 21 is off, i.e., if the bread cooking vessel 7 is set in the baking chamber 4, it is judged that the cooking vessel set in the baking chamber 4 is improper, and the cooking machine A interrupts the process while beeping to warn the user for replacement of the cooking vessel. Thus, even if the user mistakenly uses the rice cake cooking vessel 8 for the bread making process, or the bread cooking vessel 7 for the processes for the rice cake making, the use of the improper cooking vessel can be detected before the start of the process. This eliminates waste of time and ingredients, unlike in a case where a cooking failure is found after the completion of the process.

The present invention is not limited to the embodiment described above, but various modifications and alterations may be made thereto.

(1) The two cooking vessels 7, 8 are each configured so as to correspond to 1.5 loaves of bread in the aforesaid embodiment, but may be configured so as to correspond to a loaf of bread.

Figure 12:
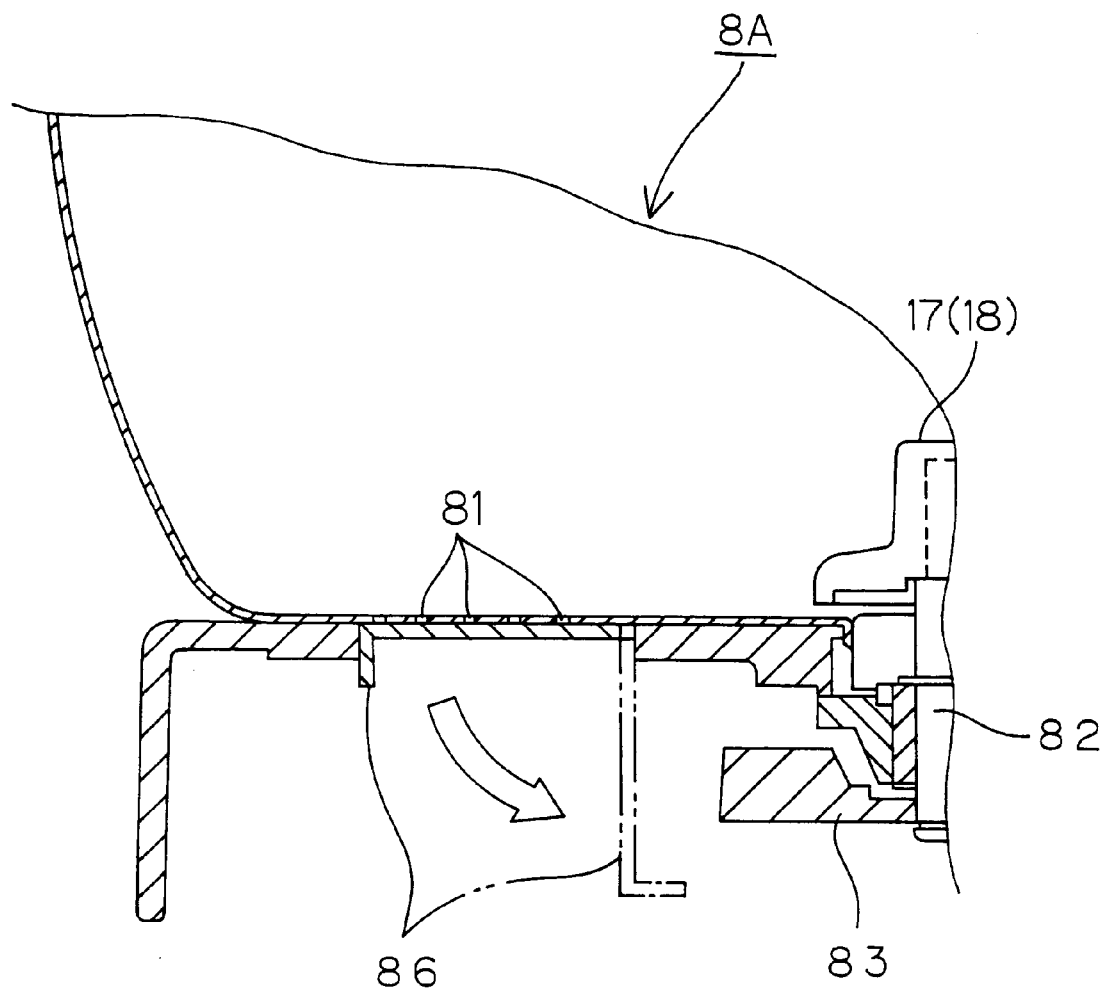
FIG. 12 is a fragmentary sectional view illustrating the construction of a cooking vessel which can be used for bread making and for rice cake making.

(2) Although the two cooking vessels 7, 8 are each used exclusively for a specific cooking process in the aforesaid embodiment, a single cooking vessel 8A as shown in FIG. 12 may be used irrespective of the cooking process to be formed. The cooking vessel 8A has steam introduction holes 81 formed in the bottom thereof, and a cover 86 for opening and closing the steam introduction holes 81. Thus, the cooking vessel 8A can be used both for the bread making process and for the rice cake making process.

Figure 13:
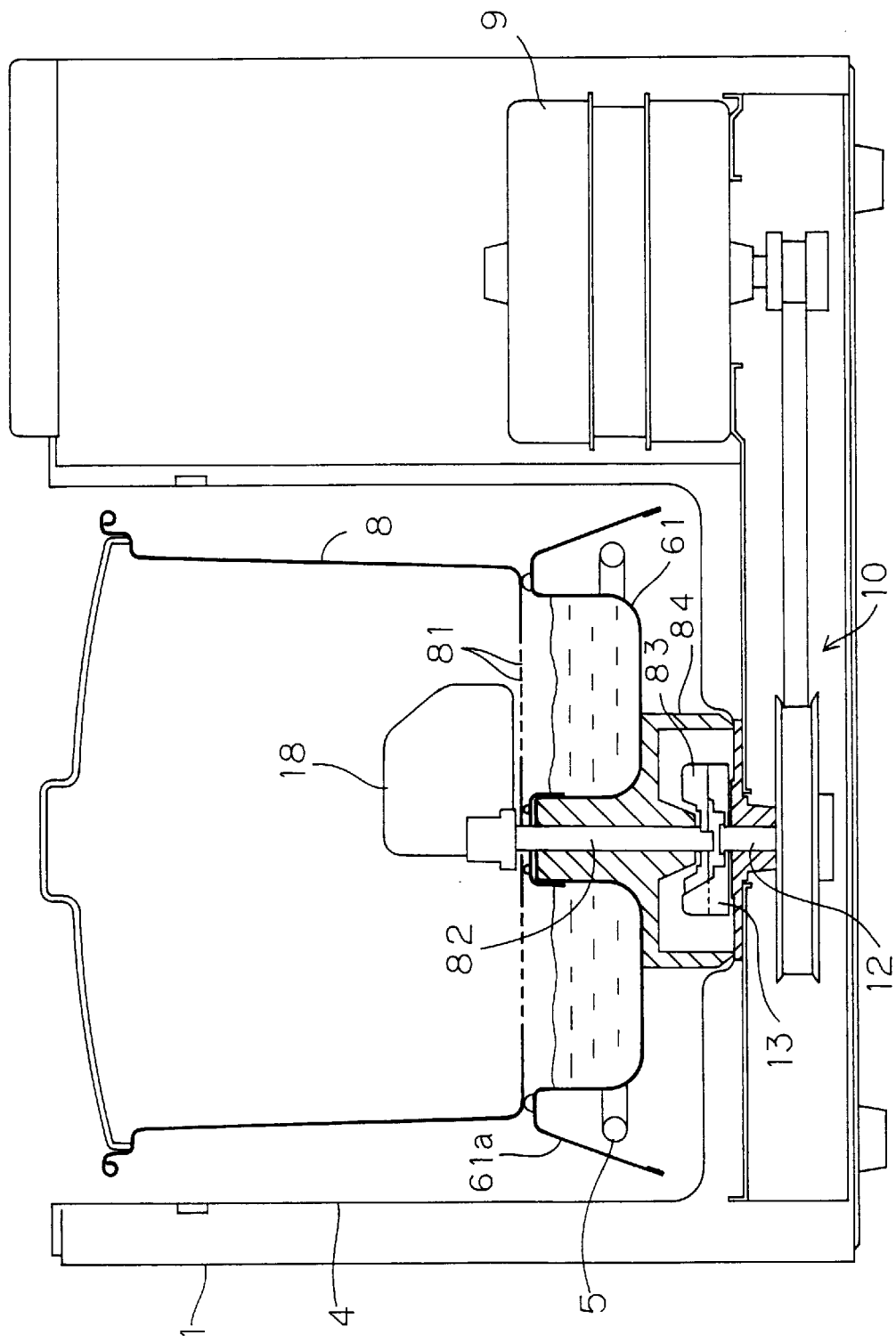
FIG. 13 is a vertical sectional front view illustrating a cooking machine according to another embodiment of the present invention when it is used for a bread making process.
Figure 14:
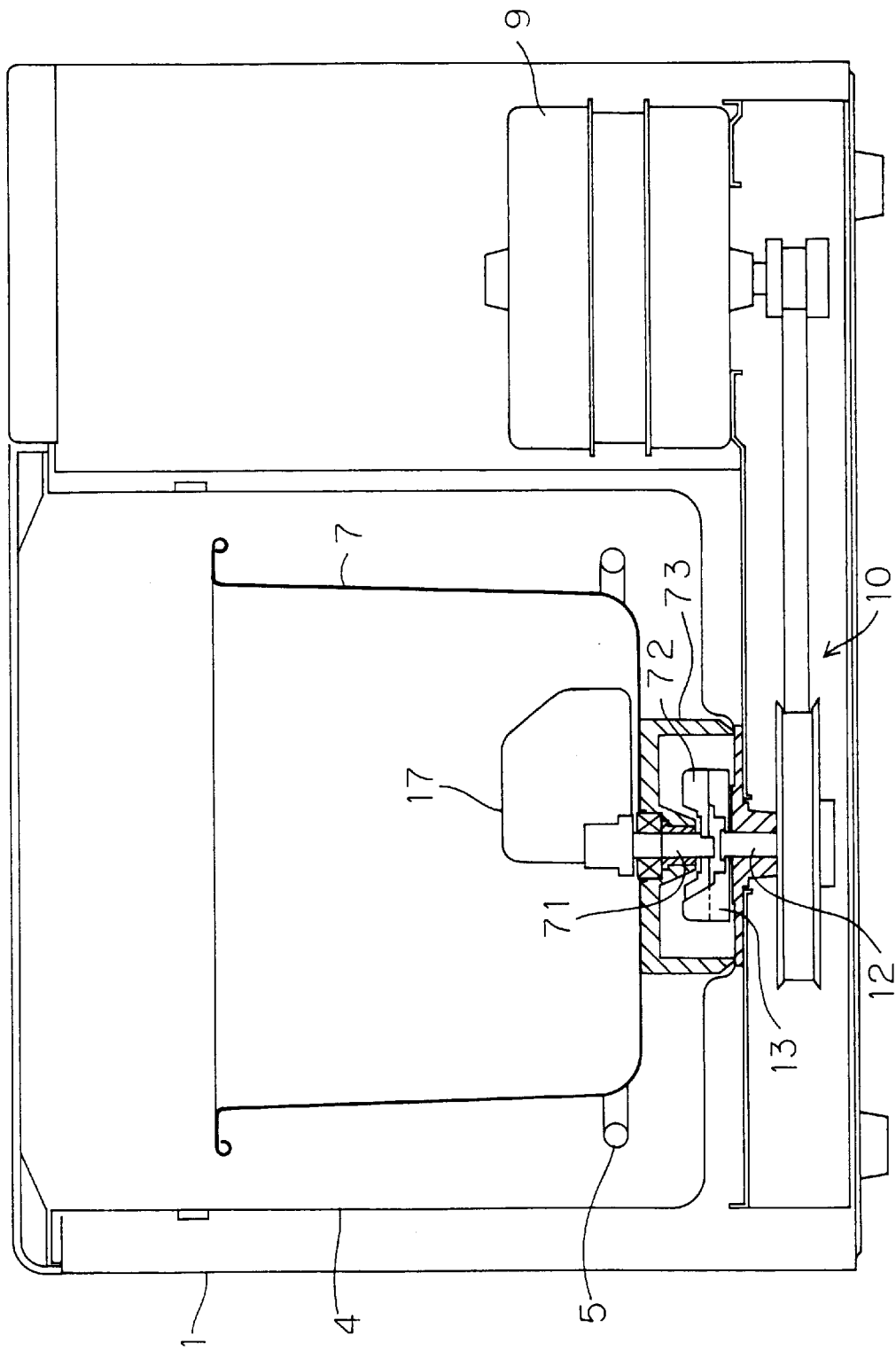
FIG. 14 is a vertical sectional front view illustrating the cooking machine of FIG. 13 when it is used for a rice cake making process.

(3) In the aforesaid embodiment, the heater 62 is used exclusively for the boiler 6. However, the baking heater 5 may double as the heater for the boiler 6 without the use of the heater 62. More specifically, the rice cake cooking vessel 8 may be constructed such that the water vessel 61 of the boiler 6 is fixed to the bottom thereof and the seat 84 is fixed to the bottom of the water vessel 61 as shown in FIG. 13. In this case, the seat 84 does not serve as a cover which covers the water vessel 61 as in the aforesaid embodiment, but has such a shape as to simply allow the cooking vessel 8 to be positioned with respect to the baking chamber 4. The water vessel 61 has a flange 61a which covers the baking heater 5. Likewise, the seat 73 of the bread cooking vessel 7 does not serve as a cover which covers the water vessel 61 as in the aforesaid embodiment, but has such a shape as to simply allow the cooking vessel 7 to be positioned with respect to the baking chamber 4, as shown in FIG. 14. These two modified cooking vessels 7, 8 may selectively be used for the bread making process and for the rice cake making process.

(4) In the aforesaid embodiment, the cooking vessel identification switch 21 is used for detection of the use of the improper cooking vessel 7, 8. However, the use of the improper cooking vessel 7, 8 may be detected by checking the ambient temperature within the baking chamber 4 without the use of the cooking vessel identification switch 21.

Figure 15:
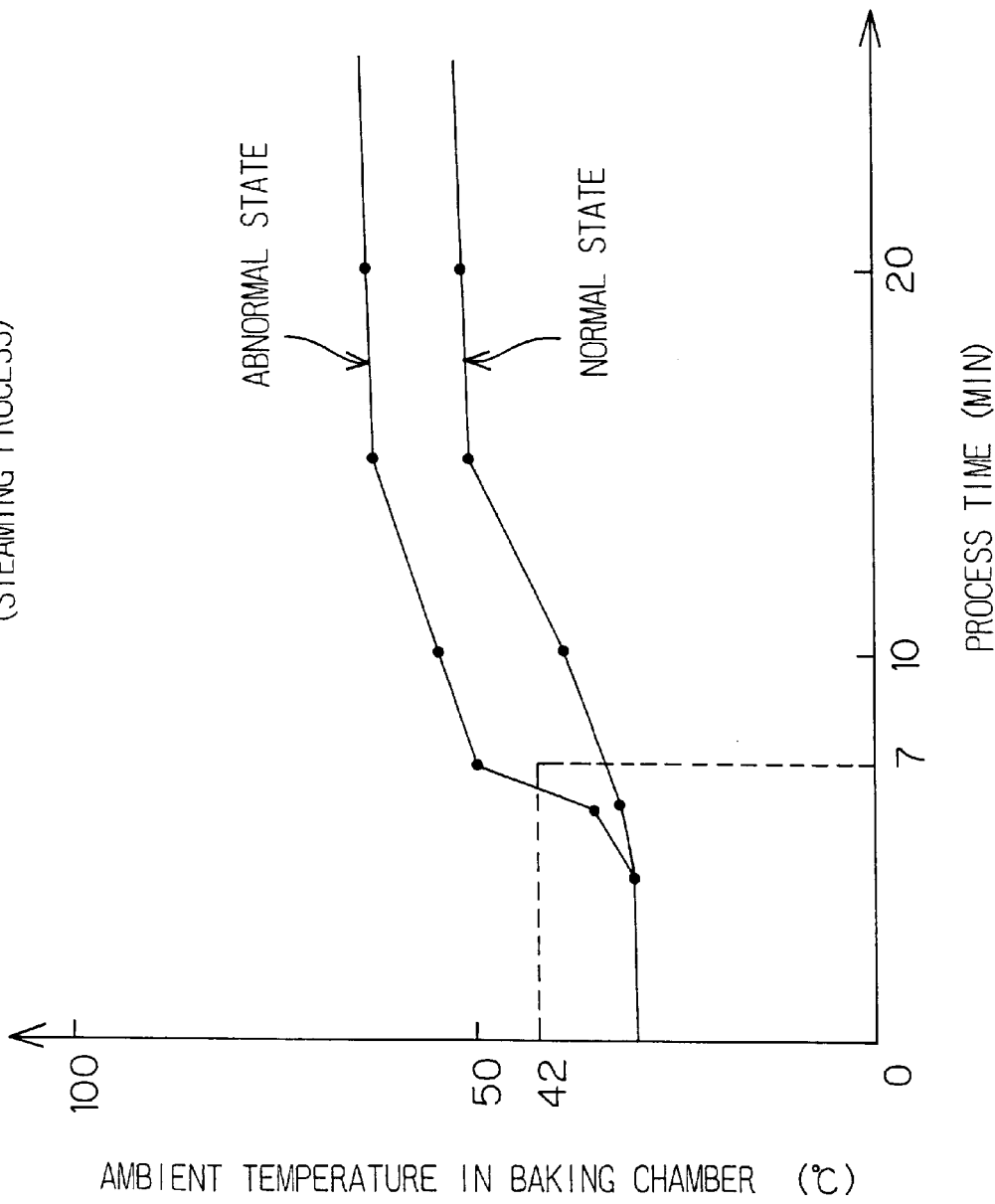
FIG. 15 is a graph illustrating changes in ambient temperature within a case during the bread making process.

If the steaming process (c) is performed with the bread cooking vessel 7 being mistakenly set in the baking chamber, for example, the steam generated by the boiler 6 cannot be supplied into the cooking vessel 7, but is released out of the boiler 6 through the steam release holes 75 of the bread cooking vessel 7. Therefore, the ambient temperature within the baking chamber 4 rises to a higher level than in the normal case due to the steam released from the steam release holes 75 at the early stage of the steaming process. As can be seen from a graph of FIG. 15, the ambient temperature within the baking chamber 4 reaches about 35° C. in the normal state but about 50° C. in the abnormal state after a lapse of 7 minutes from the start of the steaming process. In view of this phenomenon, it is determined whether or not the temperature sensed by the ambient temperature sensor 15 exceeds a predetermined level (e.g., 42° C.) after a lapse of a predetermined time period (e.g., 7 minutes) from the start of the steaming process. If the temperature is lower than the predetermined level, it is judged that the cooking machine is in the normal state, and the process is continued. If the temperature is not lower than the predetermined level, it is judged that the abnormal state occurs, and the cooking machine interrupts the process while beeping to warn the user of the occurrence of the abnormal state. Thus, the user becomes aware of the use of the improper cooking vessel at the early stage of the process, though not before the start of the process, to take early countermeasures.

Figure 16:
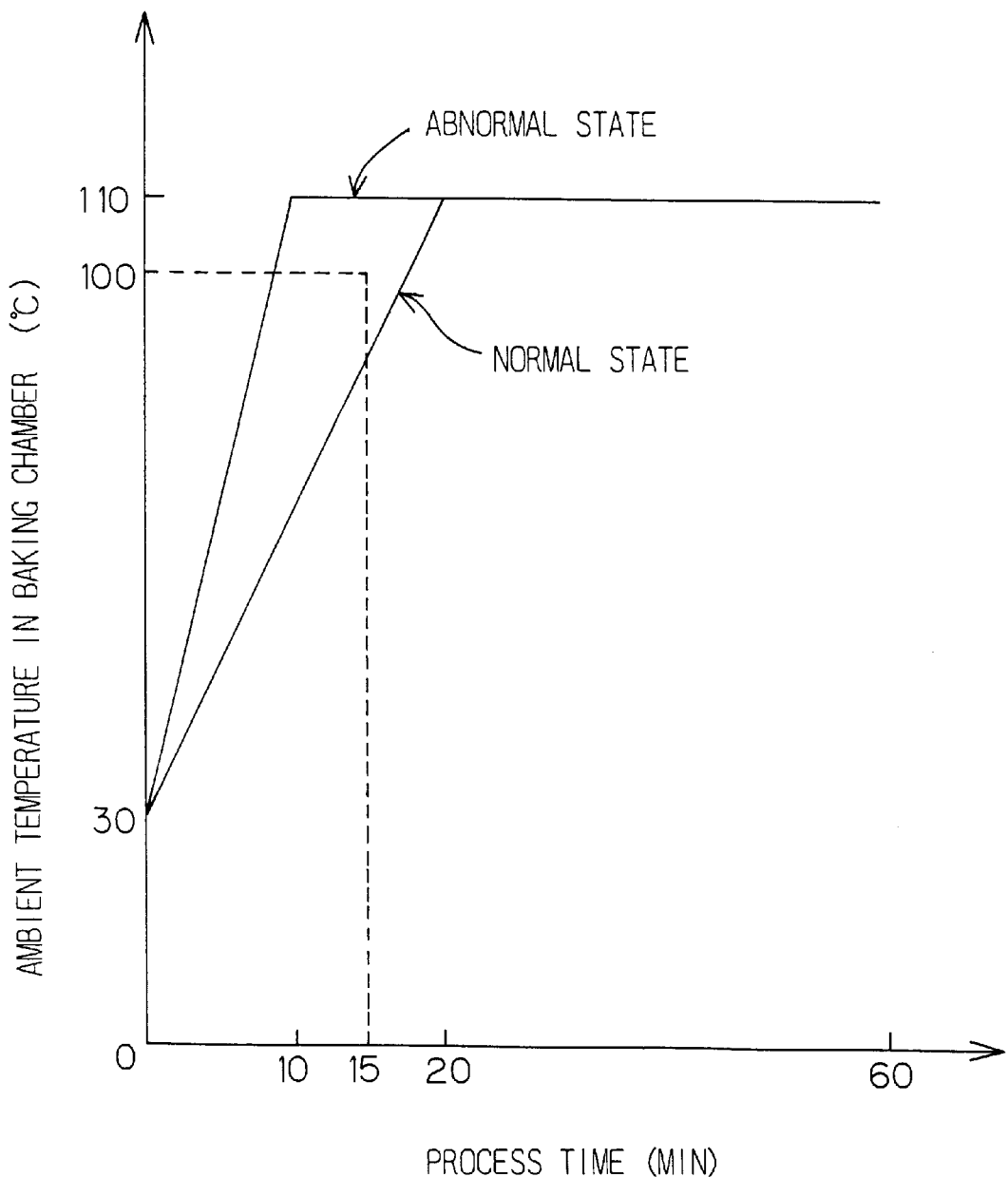
FIG. 16 is a graph illustrating changes in ambient temperature within the case during a steaming process.

If the automatic bread making process (a) is performed with the steam cooking vessel 8 being mistakenly set in the baking chamber, for example, the bread ingredients leak out of the cooking vessel 8 from the steam introduction holes 81 into the boiler 6. Therefore, the cooking vessel is heated in an empty state, so that the ambient temperature within the baking chamber 4 rises to a higher level than in the normal case at the early stage of the baking process. As can be seen from a graph of FIG. 16, the ambient temperature within the baking chamber 4 reaches about 80° C. in the normal state but about 110° C. in the abnormal state after a lapse of 15 minutes from the start of the baking process. In view of this phenomenon, it is determined whether or not the temperature sensed by the ambient temperature sensor 15 exceeds a predetermined level (e.g., 100° C.) after a lapse of a predetermined time period (e.g., 15 minutes) from the start of the baking process. If the temperature is lower than the predetermined level, it is judged that the cooking machine is in the normal state, and the process is continued. If the temperature is not lower than the predetermined level, it is judged that the abnormal state occurs, and the cooking machine interrupts the process while beeping to warn the user of the occurrence of the abnormal state. Thus, the user becomes aware of the use of the improper cooking vessel at the early stage of the process, though not before the start of the process, to take early countermeasures. Therefore, the need for provision of the cooking vessel identification switch 21 can be obviated by using the ambient temperature sensor 15 for the detection of the use of the improper cooking vessel, thereby suppressing a cost increase.

While the present invention has thus been described in detail by way of the embodiments thereof, it should be understood that the foregoing disclosure is merely illustrative of the technical principles of the present invention but not limitative of the same. The spirit and scope of the present invention are to be limited only by the appended claims.

This application claims priority benefits under 35 USC Section 119 on the basis of Japanese Patent Applications No. 10-265237, No. 10-265238, No. 10-265239 and No. 10-265240 filed to the Japanese Patent Office on Sep. 18, 1998, the disclosure thereof being incorporated herein by reference.

What is claimed is:

1. A cooking machine, comprising:

a case having a case cavity therein;

a cooking vessel removably provided in the case cavity and having an open top;

a rotary shaft extending through a bottom of the cooking vessel and having an upper end to be fitted with an agitator blade;

a driving mechanism provided below the cooking vessel for rotatively driving the rotary shaft of the cooking vessel;

a heating mechanism provided in the case cavity for adjusting an ambient temperature within the case cavity;

a steam generating mechanism for supplying steam to the cooking vessel; and management means for controlling operations of the respective components as required to selectively perform a plurality of cooking processes.

2. A cooking machine as set forth in claim 1, wherein the management means controls the operations of the respective components to selectively perform a kneading process for kneading an ingredient put in the cooking vessel, a shaping/fermenting process for allowing an ingredient to expand to a predetermined level in the cooking vessel, a baking process for baking an ingredient, and a steaming process for steaming an ingredient put in the cooking vessel.

3. A cooking machine as set forth in claim 2, wherein the management means performs a bread making process including the kneading process, the shaping/fermenting process and the baking process, and a rice cake making process including the steaming process and the kneading process.

4. A cooking machine as set forth in claim 1, wherein the steam generating mechanism is disposed between the driving mechanism and the cooking vessel in a bottom portion of the case cavity for supplying the steam to the cooking vessel.

5. A cooking machine as set forth in claim 1, wherein the steam generating mechanism includes a water vessel for retaining water therein, and a water vessel heating mechanism for heating the water vessel to evaporate the water retained therein.

6. A cooking machine as set forth in claim 5, wherein the heating mechanism doubles as the water vessel heating mechanism.

7. A cooking machine as set forth in claim 6, wherein the water vessel is at least partially located above the heating mechanism.

8. A cooking machine as set forth in claim 5, wherein the water vessel is fixed to the bottom of the cooking vessel.

9. A cooking machine as set forth in claim 5, wherein the water vessel is fixed within the case and has an open top, wherein the cooking vessel has a lid-like seat provided on the bottom thereof, the seat being adapted to be positioned with respect to the water vessel of the steam generating mechanism as covering the open top of the water vessel.

10. A cooking machine as set forth in claim 9, wherein a seal is interposed between the water vessel and the seat for sealing the water vessel with the seat being rested on the water vessel.

11. A cooking machine as set forth in claim 1, wherein the management means selectively performs a bread making process and a steam cooking process.

12. A cooking machine as set forth in claim 11,
wherein the case has an open top and is provided with a lid for opening and closing the open top,
the cooking machine further comprising a lid state sensing mechanism for sensing a state of the lid of the case,
wherein the management means recognizes the state of the lid sensed by the lid state sensing mechanism when performing the steam cooking process or the bread making process, and prohibits the steam cooking process or the bread making process depending on the open/close state of the lid.

13. A cooking machine as set forth in claim 12, wherein the management means prohibits the steam cooking process when the lid state sensing mechanism senses that the lid is closed.

14. A cooking machine as set forth in claim 12, wherein the management means prohibits the bread making process when the lid state sensing mechanism senses that the lid is open.

15. A cooking machine as set forth in claim 1, wherein the cooking vessel has a steam introduction hole formed in a bottom thereof for introduction of the steam generated by the steam generating mechanism, and a cover for switchably opening and closing the steam introduction hole.

16. A cooking machine as set forth in claim 1, wherein the cooking vessel includes a steam cooking vessel which has an open top and a bottom formed with through-holes as steam introduction holes for introduction of the steam generated by the steam generating mechanism.

17. A cooking machine as set forth in claim 16, wherein the steam cooking vessel has a generally rectangular box shape, and a greater number of steam introduction holes are provided in longitudinally opposite portions than in transversely opposite portions of the bottom of the steam cooking vessel.

18. A cooking machine as set forth in claim 16, wherein the steam cooking vessel has a generally rectangular box shape, and the total open area of steam introduction holes arranged in longitudinally opposite portions of the bottom of the steam cooking vessel is greater than the total open area of steam introduction holes arranged in transversely opposite portions of the bottom of the steam cooking vessel.

19. A cooking machine as set forth in claim 1, wherein the cooking vessel includes a bread cooking vessel having an open top and a bottom formed with no through-hole.

20. A cooking machine as set forth in claim 1, wherein the cooking vessel includes a steam cooking vessel removably provided in the case cavity and having an open top and a bottom formed with through-holes as steam introduction holes for introduction of the steam generated by the steam generating mechanism, and a bread cooking vessel removably provided in the case cavity and having an open top and a bottom formed with no through-hole.

21. A cooking machine as set forth in claim 20,
wherein a vessel fixing portion to be engaged with either of the two cooking vessels is provided on a bottom of the case cavity,
wherein the two cooking vessels respectively have fixtures of the same configuration which are each engageable to the vessel fixing portion.

22. A cooking machine as set forth in claim 20, wherein one of the two cooking vessels has a greater exterior size than the other cooking vessel so as to accommodate therein the other cooking vessel.

23. A cooking machine as set forth in claim 20, wherein the two cooking vessels each have a rotary shaft extending through the bottom thereof, the rotary shafts of the two cooking vessels being respectively adapted to be fitted with two agitator blades of different configurations which are suitable for specific cooking processes.

24. A cooking machine as set forth in claim 23, wherein the two agitator blades are removably attachable to the corresponding rotary shafts of the two cooking vessels, and engagement portions of the two agitator blades to be engaged with the corresponding rotary shafts of the two cooking vessels are respectively configured so as to allow for exclusive engagement with the corresponding rotary shafts.

25. A cooking machine as set forth in claim 20, wherein the management means selectively performs a bread making process and a steam cooking process, and includes cooking vessel identification means for determining, when either of the cooking processes is to be performed, whether or not a proper one of the cooking vessels for the cooking process to be performed is used.

26. A cooking machine as set forth in claim 25,
wherein one of the two cooking vessels is formed with an identification projection,
the cooking machine further comprising detection mechanism for detecting the identification projection when either of the cooking vessels is set in the case cavity,
wherein the cooking vessel identification means recognizes, on the basis of the detection of the identification projection by the detection mechanism, that the cooking vessel set in the case cavity is proper or improper.

27. A cooking machine as set forth in claim 26, wherein the cooking vessel identification means includes means for recognizing a cooking process to be performed in accordance with a cooking request, and recognizes, on the basis of the recognized cooking process and the detection of the identification projection by the detection mechanism, that the cooking vessel set in the case cavity is proper or improper.

28. A cooking machine as set forth in claim 25, further comprising:
a steam releasing mechanism for releasing the steam into the case cavity when the steam from the steam generating mechanism cannot be supplied into the cooking vessel; and
a temperature sensor for sensing an ambient temperature within the case cavity,
wherein the cooking vessel identification means recognizes a cooking process to be performed in accordance with a cooking request, and recognizes, on the basis of the recognized cooking process and the temperature sensed by the temperature sensor after a lapse of a predetermined time period from the start of the cooking process, that the cooking vessel set in the case cavity is proper or improper.

29. A cooking machine as set forth in claim 1, further comprising a steam releasing mechanism for releasing the steam into the case cavity when the steam from the steam generating mechanism cannot be supplied into the cooking vessel.

* * * * *